United States Patent
Wiegand et al.

(10) Patent No.: US 7,056,056 B2
(45) Date of Patent: Jun. 6, 2006

(54) COLLISION SAFETY DEVICE HAVING A BREAKAWAY SHEAR COUPLING

(76) Inventors: Kenneth E. Wiegand, 120 Sylvan, Quincy, CA (US) 95971; Stuart E. Larsen, 1198 Navigator Dr. #78, Ventura, CA (US) 93001

( * ) Notice: Subject to any disclaimer, the term of this patent is extended or adjusted under 35 U.S.C. 154(b) by 0 days.

(21) Appl. No.: 10/903,085

(22) Filed: Jul. 30, 2004

(65) Prior Publication Data

US 2006/0024131 A1    Feb. 2, 2006

(51) Int. Cl.
  *E01F 9/18* (2006.01)
(52) U.S. Cl. ............................ 404/10; 403/2; 248/548; 248/909
(58) Field of Classification Search ............... 404/6, 404/9, 10; 248/548, 909; 256/1, 13.1; 52/98; 403/2

See application file for complete search history.

(56) References Cited

U.S. PATENT DOCUMENTS

| | | | | |
|---|---|---|---|---|
| 3,499,630 A | * | 3/1970 | Dashio | 256/13.1 |
| 3,521,413 A | * | 7/1970 | Scott et al. | 52/98 |
| 3,637,244 A | * | 1/1972 | Strizki | 52/98 |
| 4,032,248 A | * | 6/1977 | Parduhn et al. | 404/10 |
| 4,071,970 A | * | 2/1978 | Strizki | 40/607.05 |
| 4,638,608 A | * | 1/1987 | Coy | 52/98 |
| 4,923,319 A | * | 5/1990 | Dent | 403/2 |
| 4,926,592 A | * | 5/1990 | Nehls | 52/98 |
| 5,354,144 A | * | 10/1994 | Lizakowski | 404/10 |
| 5,855,443 A | * | 1/1999 | Faller et al. | 403/2 |
| 6,264,162 B1 | * | 7/2001 | Barnes et al. | 248/548 |
| 6,308,927 B1 | * | 10/2001 | Leahy | 248/548 |
| 6,390,436 B1 | * | 5/2002 | Barnes et al. | 248/548 |
| 6,398,192 B1 | * | 6/2002 | Albritton | 256/13.1 |
| 6,422,783 B1 | * | 7/2002 | Jordan | 404/9 |
| 6,540,196 B1 | * | 4/2003 | Ellsworth | 248/548 |
| 6,739,567 B1 | * | 5/2004 | Curtis | 248/548 |

* cited by examiner

*Primary Examiner*—Thomas B. Will
*Assistant Examiner*—Alexandra Pechhold
(74) *Attorney, Agent, or Firm*—James E. Brunton, Esq.

(57) ABSTRACT

A collision safety device having a breakaway coupling. The collision safety device comprises first and second post segments. A first shear plate is attached to the first post segment and a second shear plate is attached to the second post segment. The first shear plate has a first contact surface and the second shear plate has a second contact surface opposite the first contact surface. The first and second shear plates are releasably attached by a breakaway coupling including a band. Friction between the shear plates and strength of the band are adjustable such that the upper post is released from the lower post when subjected to a preselected collision force.

18 Claims, 4 Drawing Sheets

COLLISION SAFETY DEVICE HAVING A BREAKAWAY SHEAR COUPLING

BACKGROUND OF THE INVENTION

1. Field of the Invention

The present invention relates to the mechanical arts. In particular, the present invention relates to collision safety devices for minimizing property damage and personal injury in vehicular collisions with roadside posts.

2. Description of Related Art

Roadside posts are used for supporting electric and communications utility wires, signage, traffic signals, fencing and for other purposes. A vehicle leaving the roadway risks striking one of these posts.

Collisions with roadside posts often cause severe damage to the post and its foundation. In addition, the vehicle involved in the collision often experiences severe damage. Repair costs for the roadside post and for the vehicle involved in the collision are significant. Moreover, injuries to vehicle occupants may result.

In a vehicular collision with a conventional roadside post, a relatively large fraction of the vehicle's kinetic energy is absorbed when the post and the vehicle are deformed. Current roadside post designs feature a rigid attachment between the post and its foundation. When a vehicle collides with the post, the post resists being separated from its foundation, while the colliding vehicle expends its kinetic energy in an attempt to overcome that resistance. During this process, unnecessarily large deformations of both the post and the vehicle occur.

Consequently, there has been a long felt need of a system that reduces the energy exchanged between the post and the vehicle during a collision to reduce post and vehicle damage and the related injuries to vehicle occupants.

SUMMARY OF THE INVENTION

Now, in accordance with the invention, there has been found a collision safety device having a breakaway coupling. The collision safety device comprises first and second post segments. A first shear plate is attached to the first post segment and a second shear plate is attached to the second post segment. The first shear plate has a first contact surface and the second shear plate has a second contact surface opposite the first contact surface. The first and second shear plates are releasably attached by a breakaway coupling.

In some embodiments, at least a portion of the shear plates extends beyond the periphery of the first and second post segments and the breakaway coupling is attached to the extended portion. And in some embodiments, the extended portion continues around the entirety of the periphery of the post segments.

In some embodiments, the breakaway coupling includes a plurality of clips arranged around and engaging the shear plates. And in some embodiments, a flexible band restrains the clips.

The contact surfaces may have various shapes including curvilinear, polygonal, octagonal, elliptical, or circular. A friction modifying material may separate at least a portion the first contact surface from the second contact surface.

In some embodiments, the friction modifying material is a material interposed between the first and the second contact surfaces. In other embodiments, the friction modifying material is a coating applied to at least one of the contact faces.

In yet another embodiment, at least one opening in at least one contact surface or the interposed friction modifying material, if any, is used to reduce the area of a contact surface.

In some embodiments, the shear clips have an inner and an outer channel describing an "I"-shaped cross-section. The inner channels engage the shear plates. At least a portion of the band is seated in the outer channels.

BRIEF DESCRIPTION OF THE DRAWINGS

The present invention is described with reference to the accompanying figures. In the figures, like reference numbers indicate identical or functionally similar elements. The accompanying figures, which are incorporated herein and form part of the specification, illustrate the present invention and, together with the description, further serve to explain the principles of the invention and to enable a person skilled in the relevant art to make and use the invention.

DESCRIPTION OF THE PREFERRED EMBODIMENTS

Figure 1:
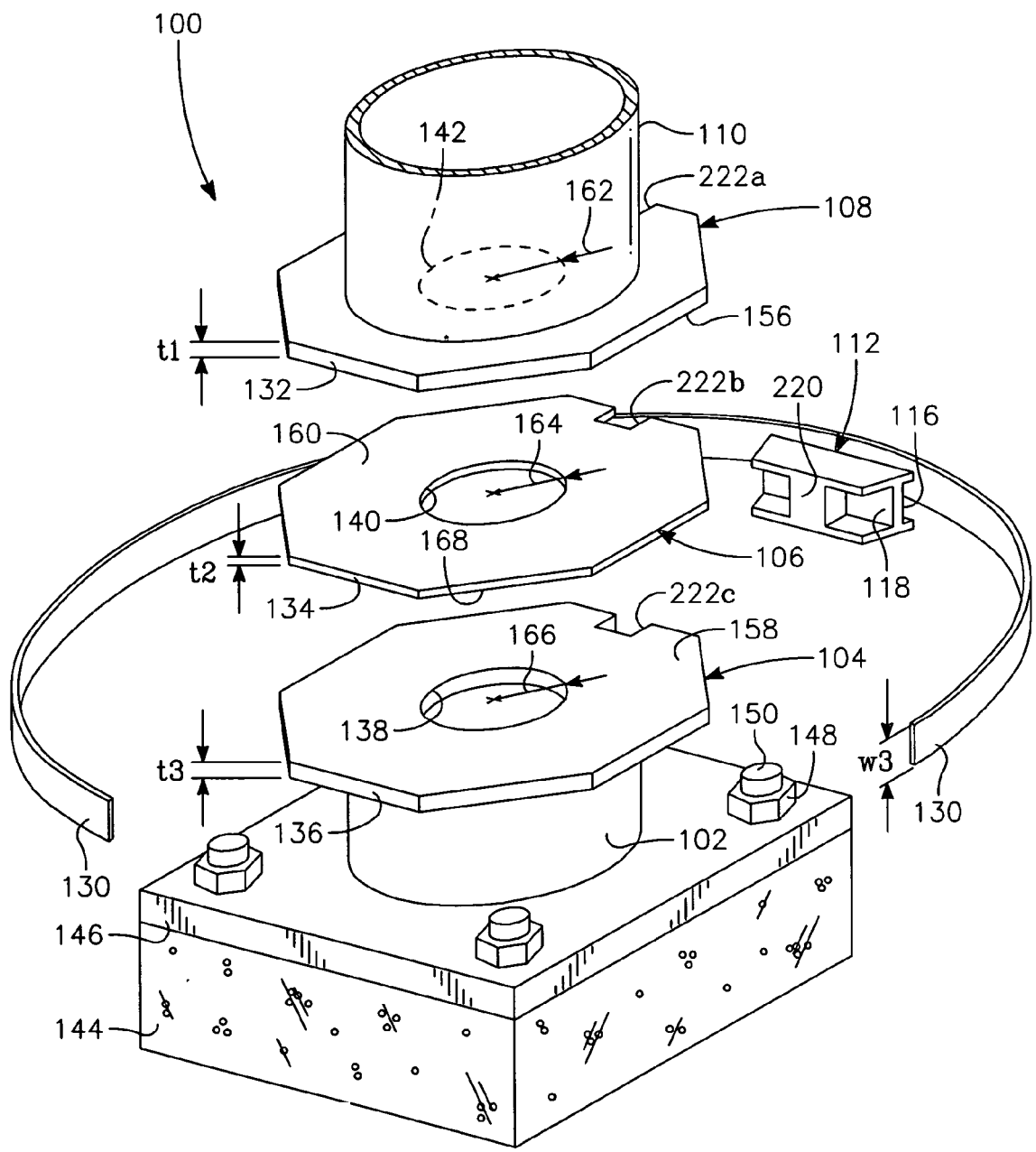
FIG. 1 is an exploded perspective view of a collision safety device having a breakaway shear coupling in accordance with the present invention.

FIG. 1 shows a collision safety device 100 in accordance with the invention. The device includes upper 110 and lower 102 post segments attached to upper 108 and lower 104 shear plates. The shear plates are joined by a breakaway coupling 176 that includes a plurality of shear clips 112, releasably secured by a flexible band 130.

The present invention provides several methods for adjusting the force required to release the breakaway coupling. A first method adjusts the friction between the upper 108 and lower 104 shear plates; increasing/decreasing the friction between the shear plates increases/decreases the force required to slide one plate relative to the other. The second method adjusts the tension required to fail the band 130; increasing/decreasing the tensile strength of the band increases/decreases the force required to break the band and thereby release the shear clips 112 that constrain relative motion between the plates.

It is an advantage of the invention, that the safety device can be used with posts made of any conventional material, such as metal or wood. In the embodiment shown in FIG. 1, the posts are made of metal and the post segments 102, 110 can be attached to the shear plates 104, 108 by any suitable method. Representative methods include welding the post segments to the shear plates or by threading the post segments into the shear plates. In the embodiment shown in FIG. 2, the posts are made of wood and the post segments can be attached to the shear plates by any suitable method. In a preferred method, a plurality of triangular gusset plates 111 are bolted or welded to the shear plate and fastened to the post segment using through bolts or screws 113.

The lower post segment 102 is attached to a base plate 146 by any suitable means. The base plate is fastened to a post foundation 144 by threaded bolts 150 embedded in the foundation and projecting through bolt holes (not shown) in the base plate. Threaded nuts 148 or other appropriate fasteners engaging the bolt projections secure the base plate to the foundation. In other embodiments, the lower post segment is welded to the base plate or screwed into the base plate.

While the shear plates 104, 108 are shown with an octagonal cross-section, a person of ordinary skill in the art will recognize that this is but one embodiment of the claimed invention. Shear plates with differing cross-sections might also be used including circular, elliptical, curvilinear, and other polygonal shapes.

Figure 2:
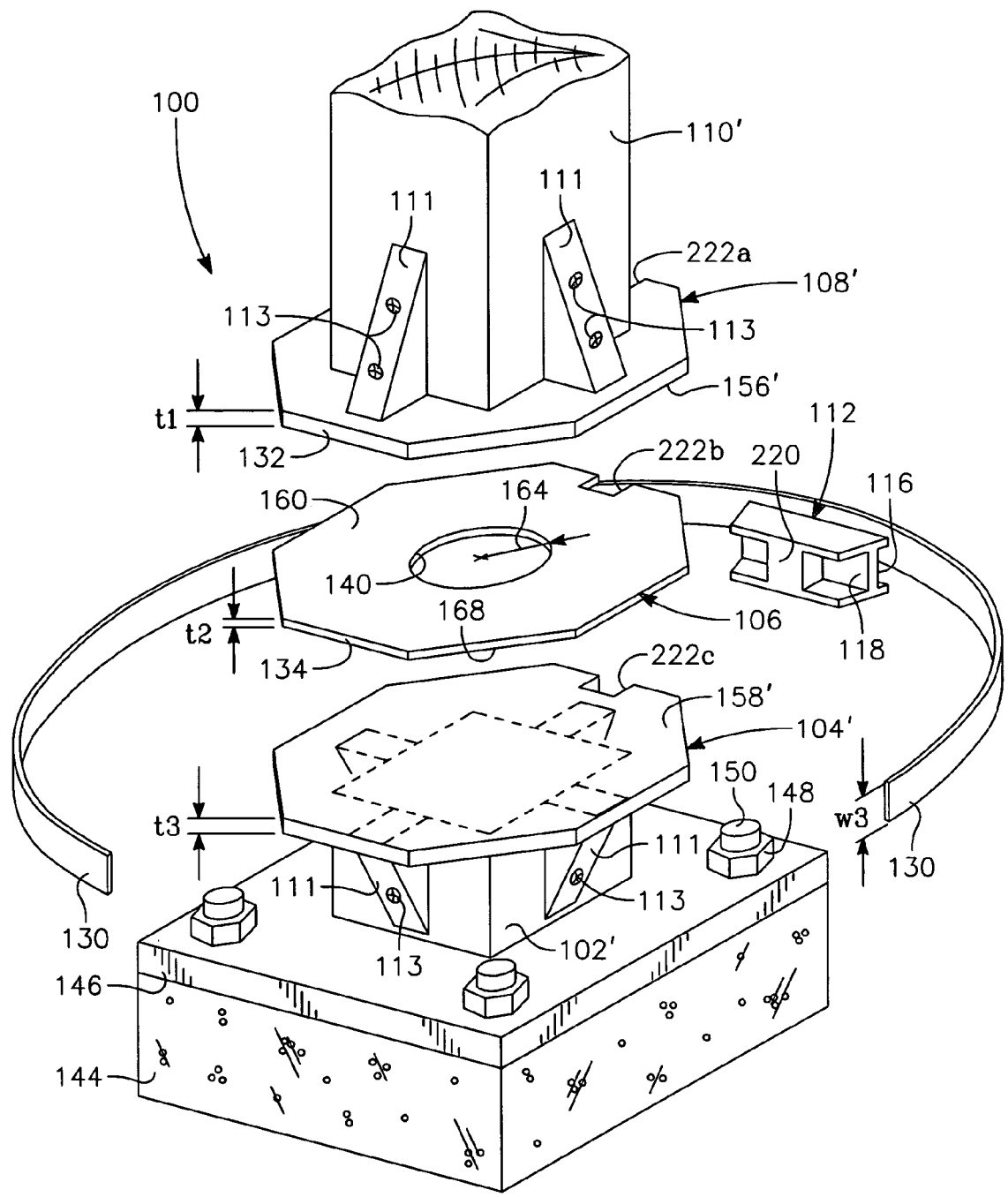
FIG. 2 is a view of a portion of a collision safety device incorporating alternative post segments.

The upper shear plate 108 has a first contact surface 156 and the lower shear plate 104 has a second contact surface 158. When the collision safety device is assembled, the first and second contact surfaces are opposed. The surface area of the contact surfaces can be decreased by making an opening 142 in the upper shear plate 108 and/or an opening 138 in the lower shear plate 104. FIGS. 1 and 2 show circular openings centered on each of the shear plates. These openings are optional and to the extent they are used, their shape and location may vary.

The friction between the shear plates 104, 108 can be varied by adjusting the area of the contact surfaces 156, 158. In some embodiments choice of contact surface material and contact surface finish can be used to modify the friction between the shear plates. In other embodiments, application of selected coatings to selected portions of the contact surfaces can be used to modify the friction between the shear plates.

Increasing/decreasing average shear plate diameters 502, 504 (FIG. 6) increases/decreases the contact area of their contact surfaces 156, 158, respectively. Alternatively, the contact area is decreased by increasing the average diameter 162 of the opening 142 in the upper shear plate 108 and/or the average diameter 166 of the opening 138 in the lower shear plate 104. A person of ordinary skill in the art will recognize that other similar methods may be used to adjust the contact area between the shear plates including raising portions of the contact faces.

In still other embodiments, the use of friction modifying material 106 interposed between the contact surfaces is used to modify the friction between the shear plates. A first contact interface exists between the upper shear plate contact surface 156 and the upper surface of the interstitial material 160. A second contact interface exists between the lower shear plate contact surface 1158 and the lower surface of the interstitial material 168. The contact area of each of these interfaces can be adjusted by the methods mentioned above. The contact surface areas may also be adjusted by varying the contact surface area 160 of the interstitial material 106 and or the average diameter 164 of the opening 140, if any, in the interstitial material.

Friction modifying materials include coatings applied to one or both of the contact surfaces (not shown) and materials including fabric or sheet stock 106 interposed between the contact surfaces. The friction modifying material may either increase or decrease the friction resisting sliding motion between the lower shear plate 104 and the upper shear plate 108. Examples of friction modifying materials include materials incorporating Teflon that decrease friction and materials incorporating elastomers that increase friction.

The shear plates 104, 108, bolts 150, nuts 148, and the base plate 146 may be made of any suitable material including metallic, plastic, or composite materials. As appropriate, welding includes the use of adhesives typical for use with any of these materials.

At least a portion 180 of the upper shear plate 108 extends beyond the outer periphery 182 of the upper post 110 and a portion 182 of the lower shear plate 104 extends beyond the outer periphery 184 of the lower post 102. When the shear plates are assembled (see also FIG. 4), a breakaway coupling releasably attaches the first shear plate to the second shear plate. In a preferred embodiment, the breakaway coupling includes a plurality of shear clips 112 arranged around the periphery of the shear plates (one shown in FIGS. 1 and 2) and releasably secured by the band 130. The octagonal shear plate shown in FIG. 1 utilizes eight clips. A person of ordinary skill in the art will recognize that the use of eight similar shear clips illustrates one of several embodiments of the claimed invention. Fewer or more shear clips designed to accommodate different shear plate shapes and designs, including assemblies having gaps between adjacent shear clips, might also be used.

Figure 3:
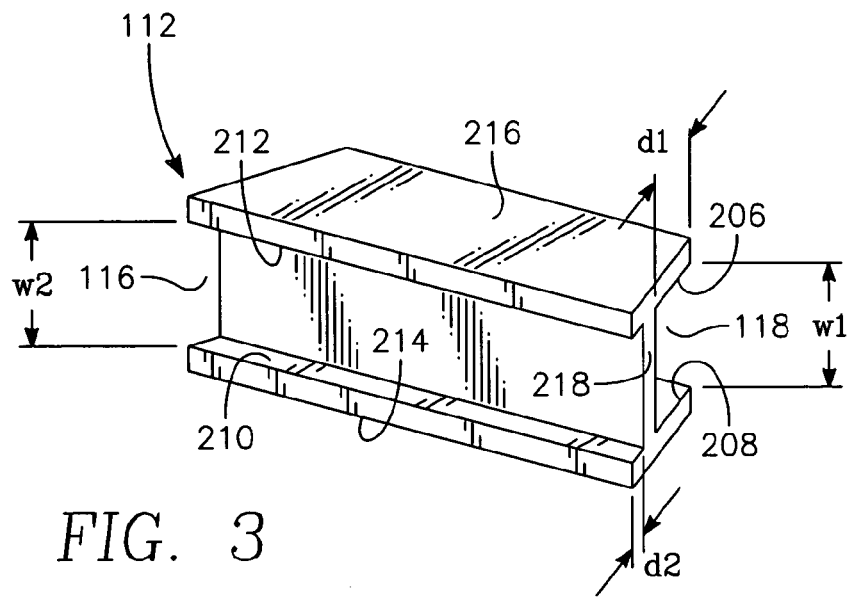
FIG. 3 is an enlarged perspective view of a first portion of the collision safety device depicted in FIG. 1.

FIG. 3 shows one embodiment made of a shear clip. The generally "I"-shaped clip comprises a web 218 extending vertically between an upper horizontal flange 216 and a lower horizontal flange 214. An inner channel 118 of depth d1 and width w1 is formed between the lower inner surface 206 of the upper flange and the upper inner surface 208 of the lower flange. The inner channel width w1 accommodates the upper shear plate thickness t1, the interposed material thickness t2 (if any), and the lower shear plate thickness t3. An outer channel 116 of depth d2 and width w2 is formed between the lower outer surface 212 of the upper flange and the upper outer surface 210 of the lower flange. The outer channel width w2 accommodates the band 130 having a width w3 (see FIGS. 1 and 2).

As seen in FIGS. 1 and 2, in some embodiments, the inner channel includes a key 220 dimensioned to be engaged by aligned notches 222a, 222b, and 222c, formed in the upper shear plate 108, the lower shear plate 104, and the intermediate material 106, if any. Such keying can be used to increase the device's resistance to static torque loading, without adversely affecting its ability to breakaway upon impact.

Figure 4:
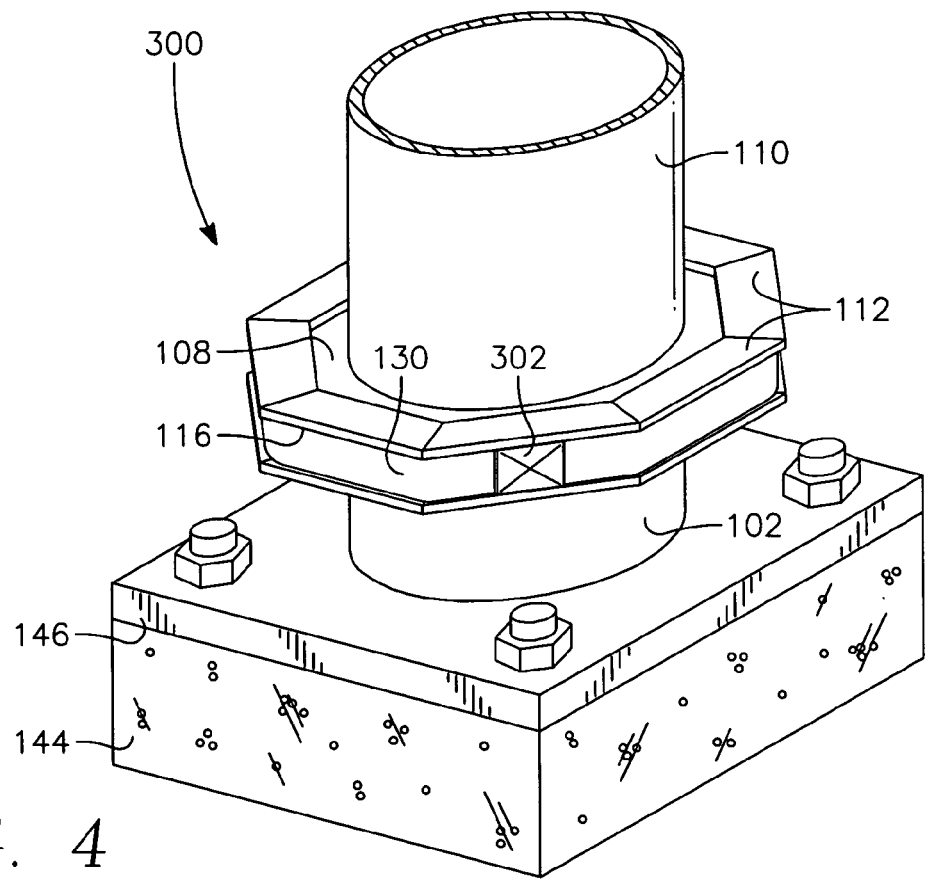
FIG. 4 is a perspective view of the assembled collision safety device depicted in FIG. 1.
Figure 5:
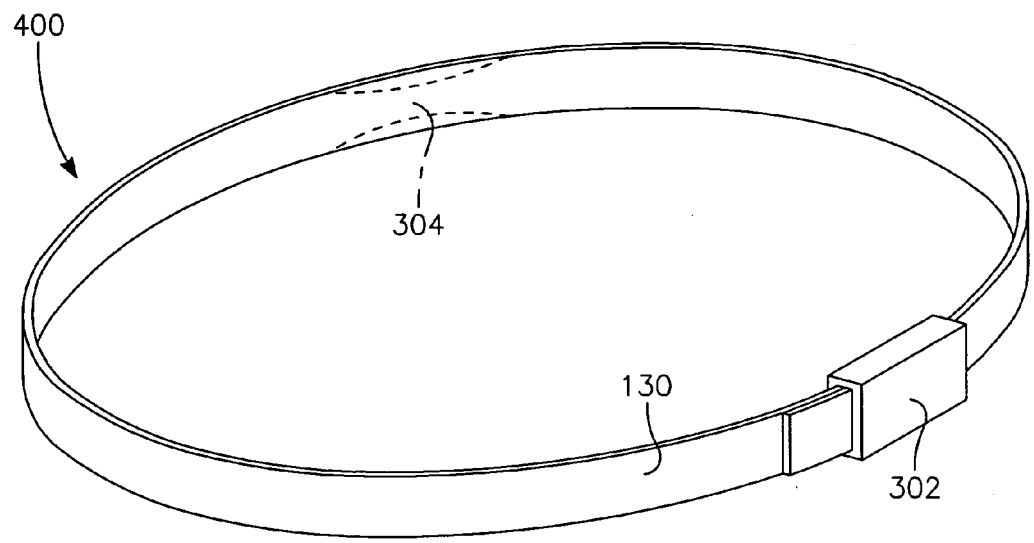
FIG. 5 is an enlarged perspective view of a second portion of the collision safety device depicted in FIG. 1.

The band has a first band end 133 and a second band end 135 secured by a band fastener 302 (see FIGS. 4 and 5). The band may be made of any suitable flexible material. Representative materials include metal, plastic, composite materials or the like. In some embodiments, the band material is chosen to provide limited elasticity. Such bands serve a torque-limiting function. If torque is applied to the upper post segment 110, while the lower post segment 102 is held in a fixed position, the band will expand and permit the shear clips 112 to pivot about one of their ends and rotate outward, thus permitting the upper shear plate to rotate relative to the lower shear plate. The coupling will then return to its original configuration, once the torque is removed.

The band fastener may be made from any suitable material. Representative materials include metal, plastic, composite materials or the like.

In some embodiments, the band material is designed and/or selected such that the band becomes the sacrificial weak-link that fails when the collision safety device is subjected to a shear force. In other embodiment, the fastener is designed and/or selected, such that the fastener becomes the sacrificial weak-link that fails when the collision safety device is subjected to a shear force. In yet other embodiments, the band may incorporate a portion having a reduced cross-section 304 that forms the weak-link. Both the band and the fastener may cooperate to provide a weak-link that breaks when the collision safety device is subjected to a shear force.

When the weak point is designed as the band 130, its tensile strength is designed to be lower than the band fastener 302. In one embodiment a band with a uniform cross-section is designed to fail under tension. In this case the tension required is a function of the band material's tensile strength and the band cross-sectional area. The breaking point along the band is not specific. In a second embodiment, a selected portion of the band is designed to fail first. An example of this design is a band with a non-uniform cross-section. In this case the tension required to fail the band is a function of the material strength and a minimum cross-sectional area 304. The failure would be expected at the point along the band with the minimum cross-sectional area.

When the failure point is designed into the band fastener 302, its tensile strength is designed to be lower than the tensile strength of the band 130. As above, the tension required to fail this weak-link depends on the material strength and the load on a minimum cross-sectional area.

FIG. 4 shows an assembled collision safety device 300. Upper post segment 110 is stacked atop lower post segment 102 such that the first contact surface 156 opposes the second contact surface 158. A plurality of the adjacent shear clips 112 having inner channels 118 engage the periphery of the shear plates. The flexible band 130 encircles the engaged shear clips and is located in an outer shear clip channel 116.

The claimed invention reduces damage to a roadside post during a collision with a moving object. Further, in the case of a vehicular collision, the claimed invention reduces vehicle damage and injuries to vehicle occupants. The claimed invention accomplishes these objectives by enabling the upper post 110 to "breakaway" during a collision and to be freely moved away from its foundation 144.

Vehicular energy dissipated during the collision is both reduced and redistributed by the claimed invention. Formerly, a relatively larger amount of the vehicle's kinetic energy was dissipated during relatively larger deformations of the vehicle and the rigidly coupled post. In the present invention, the collision safety device having a breakaway coupling replaces a rigid connection between an upper post and its foundation. With a collision safety device having a breakaway coupling, the upper post is released from its foundation by the force of the collision and a relatively smaller amount of the vehicle's kinetic energy is dissipated during acceleration of the detached upper portion of the post.

Figure 6:
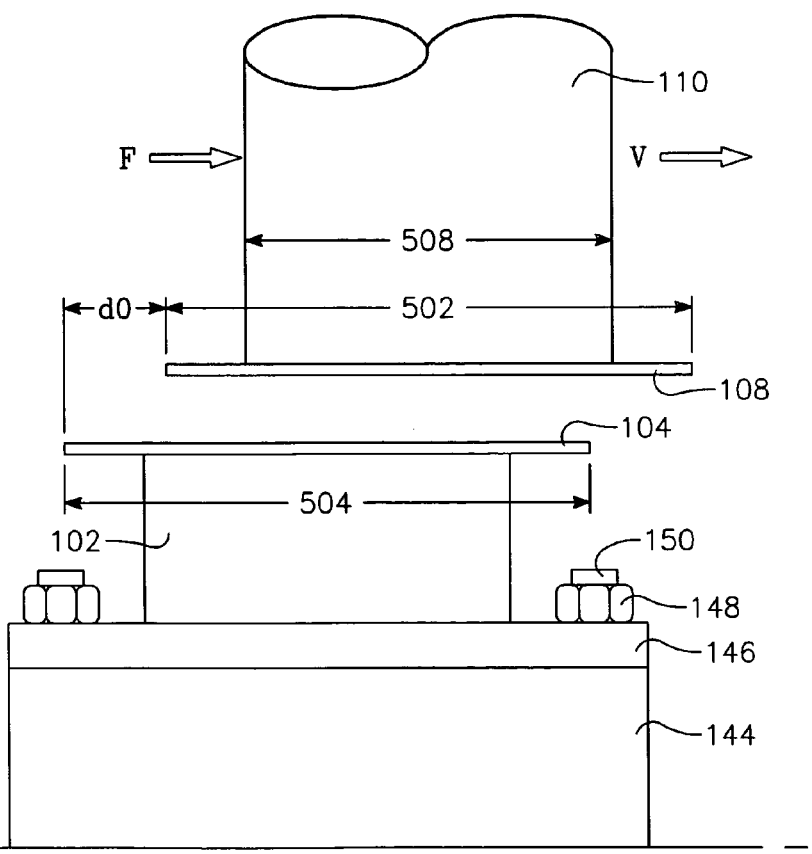
FIG. 6 is a side view of the collision safety device depicted in FIG. 1 during a collision.

FIG. 6 shows a collision safety device 100 in accordance with the invention during a collision. The force of the collision F moves the upper post 110, failing a sacrificial weak-link in the band 130 (see FIG. 4) as upper shear plate 108 slides relative to the lower shear plate 104 in the direction of the force F. The failed band releases the shear clips 112 (see FIG. 4) and allows the upper shear plate to slide more freely. The energy imparted to the upper post by the force of the collision results in the upper post being moved away from its foundation 144 with a velocity V. Collision energy formerly absorbed by deforming the post and the vehicle is now reduced and shared between breaking the sacrificial weak-link of the belt assembly, overcoming friction developed between the shear plates and accelerating the upper portion of the post.

While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A collision safety device comprising:
   a post including first and second post segments, each said first and second post segment having a periphery;
   a first shear plate attached to said first post segment, said first shear plate having a first contact surface, at least a portion of said first shear plate extending beyond and continuing around the entirety of said periphery of said first and second post segments;
   a second shear plate attached to said second post segment, said second shear plate having a second contact surface opposite said first contact surface, at least a portion of said second shear plate extending beyond and continuing around the entirety of said periphery of said first and second shear segments; and
   a breakaway coupling for releasably attaching said first shear plate to said second shear plate, said breakaway coupling being releasably attached to said extended portion of said first and second shear plates and including a plurality of shear clips arranged around and engaging the outer periphery of the shear plates and a flexible band circumscribing and releasably securing said plurality of shear clips.

2. The collision safety device of claim 1 further comprising a friction modifying material interposed between the first and second contact surfaces.

3. The collision safety device of claim 2 wherein the friction modifying material contains at least one opening.

4. The collision safety device of claim 2 wherein the friction modifying material comprises a coating applied to at least one of the contact surfaces.

5. A collision safety device comprising:
   a post including first and second post segments;
   a first shear plate attached to said first post segment, said first shear plate having a first contact surface;
   a second shear plate attached to said second post segment, said second shear plate having a second contact surface opposite said first contact surface; and,
   a breakaway coupling for releasably attaching said first shear plate to said second shear plate, said breakaway coupling comprising a shear clip engaging the periphery of said first and second shear plates and a flexible band restraining said shear clip, said shear clip having a channel for receiving said band.

6. The collision safety device of claim 5 further comprising a friction modifying material disposed between said first and second contact surfaces.

7. The collision safety device of claim 5 wherein said band has sufficient elasticity to permit the first shear plate to rotate relative to the second shear plate when torque is applied to one of said shear plates.

8. A collision safety device comprising:
   a post including first and second post segments, each said first and second post segment having a periphery;
   a first shear plate attached to said first post segment, said first shear plate having a first contact surface, at least a portion of said first shear plate extending beyond and continuing around the entirety of said periphery of said first and second post segments;

a second shear plate attached to said second post segment, said second shear plate having a second contact surface opposite said first contact surface, at least a portion of said second shear plate extending beyond and continuing around the entirety of said periphery of said first and second shear segments; and a breakaway coupling for releasably attaching said first shear plate to said second shear plate, said breakaway coupling being releasably attached to said extended portion of said first and second shear plates and including a plurality of clips arranged around and engaging the shear plates and a band restraining said clips, said shear clips having an inner and an outer channel describing an "I"-shaped cross section.

9. The collision safety device of claim 8 further comprising a friction modifying material interposed between the first and second contact surfaces.

10. The collision safety device of claim 9 wherein the friction modifying material contains at least one opening.

11. The collision safety device of claim 9 wherein the friction modifying material comprises a coating applied to at least one of the contact surfaces.

12. The collision safety device of claim 9 wherein the inner channels engage the shear plates.

13. The collision safety device of claim 12 wherein at least a portion of the band is seated in the outer channels.

14. The collision safety device of claim 13 wherein the band includes a band and a band fastener.

15. The collision safety device of claim 14 wherein the band has a first band end and a second band end coupled by said band fastener.

16. The collision safety device of claim 15 wherein the band includes a sacrificial weak-link.

17. The collision safety device of claim 14 wherein the band has sufficient elasticity to permit the first shear plate to rotate relative to the second shear plate when torque is applied to one of the shear plates.

18. The collision safety device of claim 17 wherein the first shear plate and the second shear plate include at least one pair of aligned notches and the inner channel of at least one clip has a key which engages the aligned notches.

* * * * *